No. 749,100. PATENTED JAN. 5, 1904.
F. ROSENOW.
DRAFT EVENER.
APPLICATION FILED JULY 6, 1903.
NO MODEL.
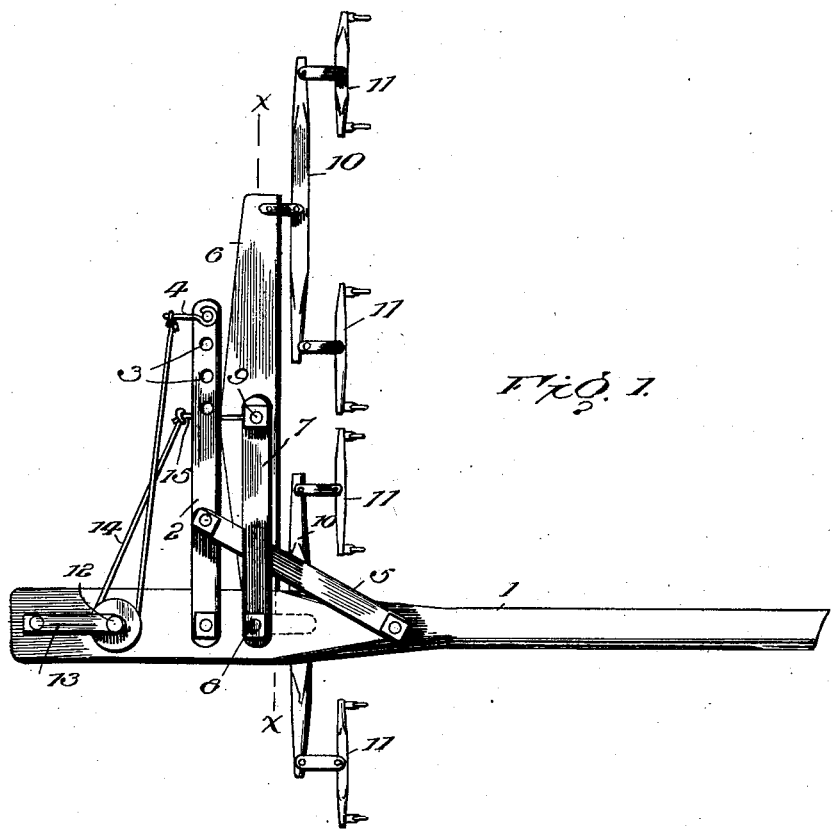
FIG. 1.
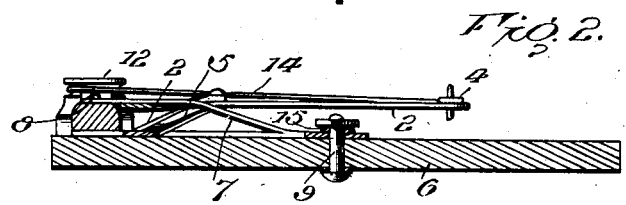
FIG. 2.
FIG. 3.
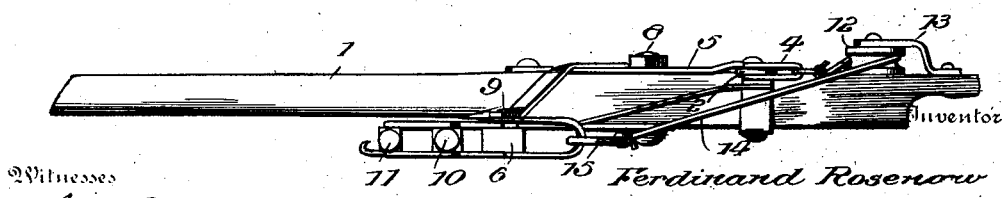
Witnesses
Inventor
Ferdinand Rosenow
By R.S. & A.B. Lacey, Attorneys No. 749,100. Patented January 5, 1904.

UNITED STATES PATENT OFFICE.

FERDINAND ROSENOW, OF RENFROW, OKLAHOMA TERRITORY.

DRAFT-EVENER.

SPECIFICATION forming part of Letters Patent No. 749,100, dated January 5, 1904.

Application filed July 6, 1903. Serial No. 164,474. (No model.)

*To all whom it may concern:*

Be it known that I, FERDINAND ROSENOW, a citizen of the United States, residing at Renfrow, in the county of Grant and Territory of Oklahoma, have invented certain new and useful Improvements in Draft-Eveners, of which the following is a specification.

This invention appertains to appliances for equalizing the draft upon opposite sides of a pole or tongue when arranging the draft-animals in unequal number upon opposite sides of the pole. This is of especial advantage in agricultural machinery, particularly for harvester binders and mowers.

The present invention is illustrated in connection with a four-horse evener, although it is to be understood that the same principles may be utilized in adapting the invention for a greater or a less number of draft-animals.

The invention consists, essentially, of the novel features and details of construction which hereinafter will be more particularly set forth, illustrated, and claimed.

In the drawings hereto attached and forming a part of the specification, Figure 1 is a top plan view of a draft-evener embodying the invention. Fig. 2 is a section on the line X X of Fig. 1 looking to the rear. Fig. 3 is a side view thereof.

Corresponding and like parts are referred to in the following description and indicated in all the views of the drawings by the same reference characters.

The pole or tongue is indicated at 1. An arm 2 is secured at its inner end to the pole or tongue and extends horizontally from one side thereof and is provided at its outer end with a series of openings 3 for adjustable connection therewith of the clevis 4. A brace 5 is interposed between the arm 2 and pole 1 for strengthening said arm.

The swingletree 6 is pivotally connected intermediate of its ends to a support 7, pivotally connected to the pole or tongue 1 and comprises upper and lower companion members having their outer ends brought together and their inner ends spaced apart, so as to embrace the upper and lower sides of the pole or tongue to which they are pivoted by means of the bolt 8 or analogous fastening. The lowermost member of the support 7 is straight, whereas the upper member is curved outward and downward to meet the outer end of the lower member, to which it is connected by the bolt or fastening 9, which is utilized for connecting the swingletree thereto. Doubletrees 10 are connected to the end portions of the swingletree in the usual manner and in turn have the swingletrees 11 connected in any accustomed manner thereto, the parts being arranged to enable one horse to walk upon one side of the pole or tongue and three horses to walk upon the opposite side of said pole or tongue.

A pulley or its equivalent 12 is arranged upon the pole or tongue in the rear of the arm 2, and its supporting pin or bolt is braced by the strap 13. A rope, cable, chain, or like flexible connection 14 passes around the pulley 12 and has one end connected to the swingletree and its opposite end to the clevis 4. The end of the flexible connection 14, connected to the swingletree, is engaged with a clip 15, which in turn has its end portions connected to the end portions of the bolt or fastening 9. The leverage may be varied to equalize the draft by shifting the clevis 4 along the arm 2, said clevis being secured in the located position by passing its bolt through the proper opening of the series of openings 3, as will be readily comprehended.

The arm 2 and the brace 5 may be composed of companion members like the support 7, the inner ends of the members being separated and embracing the upper and the lower sides of the pole.

Having thus described the invention, what is claimed as new is—

1. In a draft-evener, the combination of the pole, an arm projected laterally therefrom, a support pivoted at its inner end to the pole and projected from the same side thereof as the arm, a swingletree pivoted to the outer end of said support and provided at its ends with draft-attaching devices, and a flexible connection secured at one end to the swingletree and having adjustable connection at its opposite end with the aforementioned arm and having loose connection intermediate of its ends with said pole, substantially as set forth.

2. In combination, a pole, an arm projected laterally from the pole and having a series of openings in its length, a brace between said arm and pole, a pivoted support comprising companion members having their outer ends brought together and their inner ends embracing opposite sides of the pole, one of said members resting upon said brace, a swingletree pivoted to the outer end of the support and provided at its ends with draft-attaching devices, a pulley applied to the pole in the rear of the arm, a flexible connection passed around said pulley, means for connecting one end of said flexible connection with the fastening pivotally connecting the swingletree and pivoted support, and a clevis adjustably connecting the opposite end of said flexible connection with the aforementioned arm, substantially as set forth.

In testimony whereof I affix my signature in presence of two witnesses.

FERDINAND ROSENOW. [L. S.]

Witnesses:
O. T. PETERSON,
A. POLLET.